United States Patent [19]

Harada

[11] Patent Number: 5,751,922
[45] Date of Patent: May 12, 1998

[54] OUTPUT CONTROL APPARATUS AND METHOD WITH VARIABLE OUTPUT SETTINGS

[75] Inventor: Takuto Harada, Koshigaya, Japan

[73] Assignee: Canon Kabushiki Kaisha, Tokyo, Japan

[21] Appl. No.: 734,310

[22] Filed: Oct. 21, 1996

Related U.S. Application Data

[63] Continuation of Ser. No. 142,088, Oct. 28, 1993, abandoned.

[30] Foreign Application Priority Data

Nov. 9, 1992 [JP] Japan ................................ 4-298471

[51] Int. Cl.$^6$ ........................................... G06K 15/00
[52] U.S. Cl. ..................... 395/112; 395/114; 395/352
[58] Field of Search ............................. 395/114, 112, 395/113, 101, 115, 352, 335

[56] References Cited

U.S. PATENT DOCUMENTS

| | | | |
|---|---|---|---|
| 4,902,146 | 2/1990 | Ishikawa | 400/61 |
| 5,050,098 | 9/1991 | Brown, III et al. | 395/112 |
| 5,075,874 | 12/1991 | Steeves et al. | 395/112 |
| 5,268,993 | 12/1993 | Ikenoue et al. | 395/114 |
| 5,276,795 | 1/1994 | Hoeber et al. | 395/156 |
| 5,307,464 | 4/1994 | Akao et al. | 395/352 |
| 5,347,626 | 9/1994 | Hoeber et al. | 395/156 |
| 5,371,837 | 12/1994 | Kimber et al. | 395/112 |
| 5,561,744 | 10/1996 | Sugaya et al. | 395/112 |
| 5,568,594 | 10/1996 | Suzuki | 395/112 |
| 5,617,518 | 4/1997 | Kuwamoto et al. | 395/114 |
| 5,638,497 | 6/1997 | Kimber et al. | 395/114 |

FOREIGN PATENT DOCUMENTS 0192021  8/1986  European Pat. Off. .
0250777  1/1988  European Pat. Off. .

OTHER PUBLICATIONS

*IBM Technical Disclosure Bulletin,* "Parameter–Specific Exercising of Hardware Devices", vol. 33, No. 8, pp. 61–64, Jan. 1991.

*Primary Examiner*—Dwayne Bost
*Assistant Examiner*—Tracy M. Legree
*Attorney, Agent, or Firm*—Fitzpatrick, Cella, Harper & Scinto

[57] ABSTRACT

In an output control method and apparatus, various kinds of setting items can be set or changed in accordance with a function which has been newly added at the side of an output apparatus. A setting-item file of an emulator supplied to the output apparatus is read, and read data are analyzed. A setting menu of the setting-item file is constructed and displayed on the picture surface of a host computer based on the result of the analysis. A setting item of the setting-item file is changed based on a value input in response to the displayed picture surface.

21 Claims, 10 Drawing Sheets

OUTPUT CONTROL APPARATUS AND METHOD WITH VARIABLE OUTPUT SETTINGS

This application is a continuation, of Application No. 08/142,088, filed Oct. 28, 1993, which is now abandoned.

BACKGROUND OF THE INVENTION

1. Field of the Invention

This invention relates to an output control method and apparatus, in which various kinds of output conditions and the like of an output apparatus can be set.

2. Description of the Related Art

Printing-condition setting programs have been known, in which printing conditions of a printer, provided from a host computer connected thereto by a bidirectional interface, can be set by inputting the printing conditions, specification information and the like relating to various kinds of states set in the printer, displaying input data on a display picture surface of the host computer, and outputting various kinds of input conditions and specification information while referring to the display picture surface to the printer. Such a program includes fixed items which can be set in the printer. In general, various conditions of the printer are set by displaying the items on the picture surface of the host computer, changing setting values for respective items by the user, and transmitting the set values to the host computer.

When setting conditions in the printer using the above-described printing-condition setting program, since setting items for the printer are fixed in the program, new items added by a newly added emulator cannot be set in the printer.

FIG. 7 illustrates such a case. In FIG. 7, printer 801 can be operated by emulator A and emulator B. Setting items 805 peculiar to emulator A, and setting items 806 peculiar to emulator B are stored in nonvolatile RAM (random access memory) 804 of printer 801. Reference numeral 803 represents a program for setting these setting items, which is started by host computer 802, and in which setting items 805 peculiar to emulator A and setting items 806 peculiar to emulator B can be set. If emulator C having peculiar setting items is added as an option for printer 801 after constructing the above-described printing system, setting items 807 peculiar to emulator C, which must be stored in non-volatile RAM 804, cannot be set in the above-described setting program 803.

SUMMARY OF THE INVENTION

The present invention has been made in consideration of the above-described problem.

It is an object of the present invention to provide an output control method and apparatus, in which various kinds of setting items can be set or changed in accordance with a function which has been newly added at the side of an output apparatus.

According to one aspect, the present invention, which achieves this object, relates to an output control method and apparatus in which specification items of an output device can be set from an external apparatus, and there are steps of reading a setting-item file of an operation program supplied to the output device, analyzing read data, constructing a setting menu of the setting-item file based on the result of the analysis, and changing a setting item of the setting-item file based on a value input in response to a picture surface displaying the constructed menu.

In the output control method and apparatus of the present invention, a setting-item file of an operation program supplied to the output device is read, and read data are analyzed. A setting menu of the setting-item file is constructed based on the result of the analysis. A setting item of the setting-item file is changed based on a value input in response to a picture surface displaying the constructed menu.

The foregoing and other objects, advantages and features of the present invention will become more apparent from the following description of the preferred embodiments taken in conduction with the accompanying drawings.

DESCRIPTION OF THE PREFERRED EMBODIMENTS

Preferred embodiments of the present invention will now be described in detail with reference to the drawings.

Figure 1:
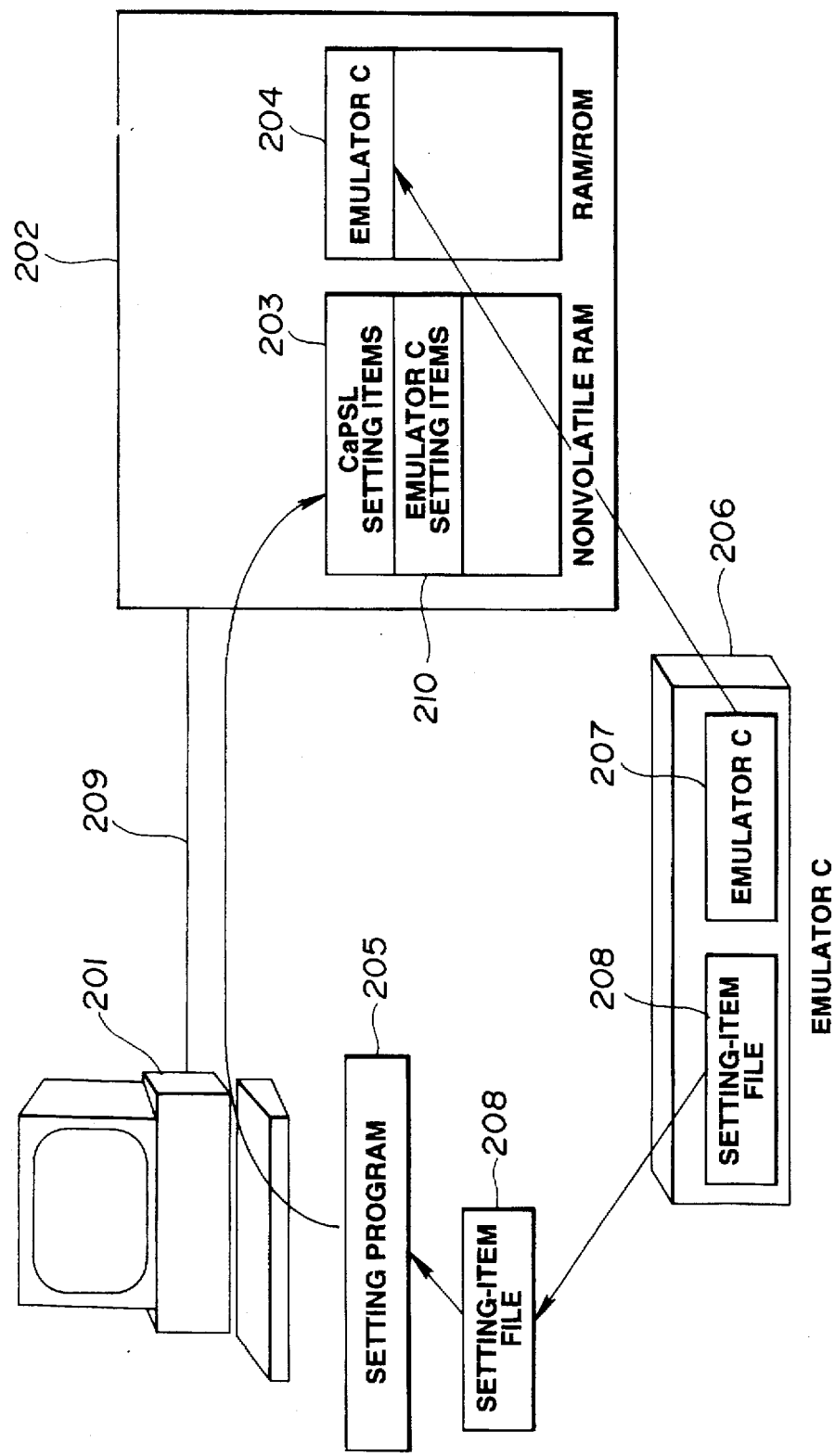
FIG. 1 is a schematic diagram illustrating the configuration of a printing system according to an embodiment of the present invention.

FIG. 1 is a schematic diagram illustrating the configuration of a printing system according to an embodiment of the present invention.

In FIG. 1, reference numeral 201 represents a host computer. Printer 202 is connected to host computer 201 via cable 209. Nonvolatile RAM 203 is incorporated in printer 202. Various kinds of setting items provided by emulator C are set and stored in nonvolatile RAM 203. Printer 202 incorporates RAM/ROM (read-only memory) 204, in which optional emulator C 207 for printer 202 is to be installed. Reference numeral 205 represents a setting program for setting various kinds of printing conditions and the like of printer 202, which is loaded in the main memory of host computer 201 and is executed. Various kinds of setting items stored in nonvolatile RAM 203 of printer 202 are set by this setting program 205. Reference numeral 206 represents an emulator-C package which is newly purchased after the user has purchased printer 202. This package 206 includes a main body 207 of emulator C, and a setting-item file 208 for the printer peculiar to respective emulators (hereinafter termed a "setting-item file").

Next, a description will be provided of a flow from the purchase of emulator package 207 until the installation of setting items peculiar to the emulator in setting program 205.

Figure 2:
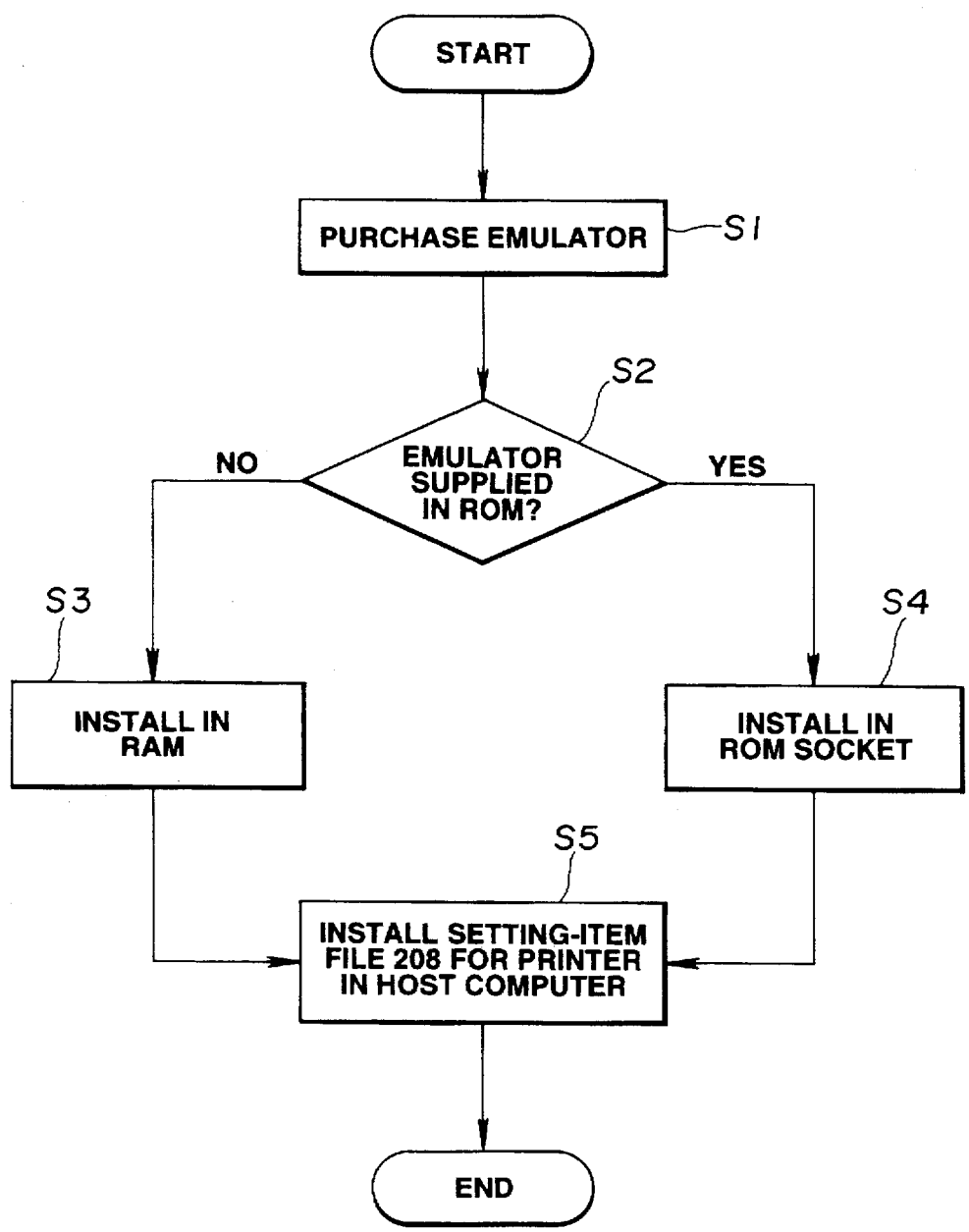
FIG. 2 is a diagram illustrating a procedure of adding an emulator to a printer of the printing system of the embodiment.
Figure 3:
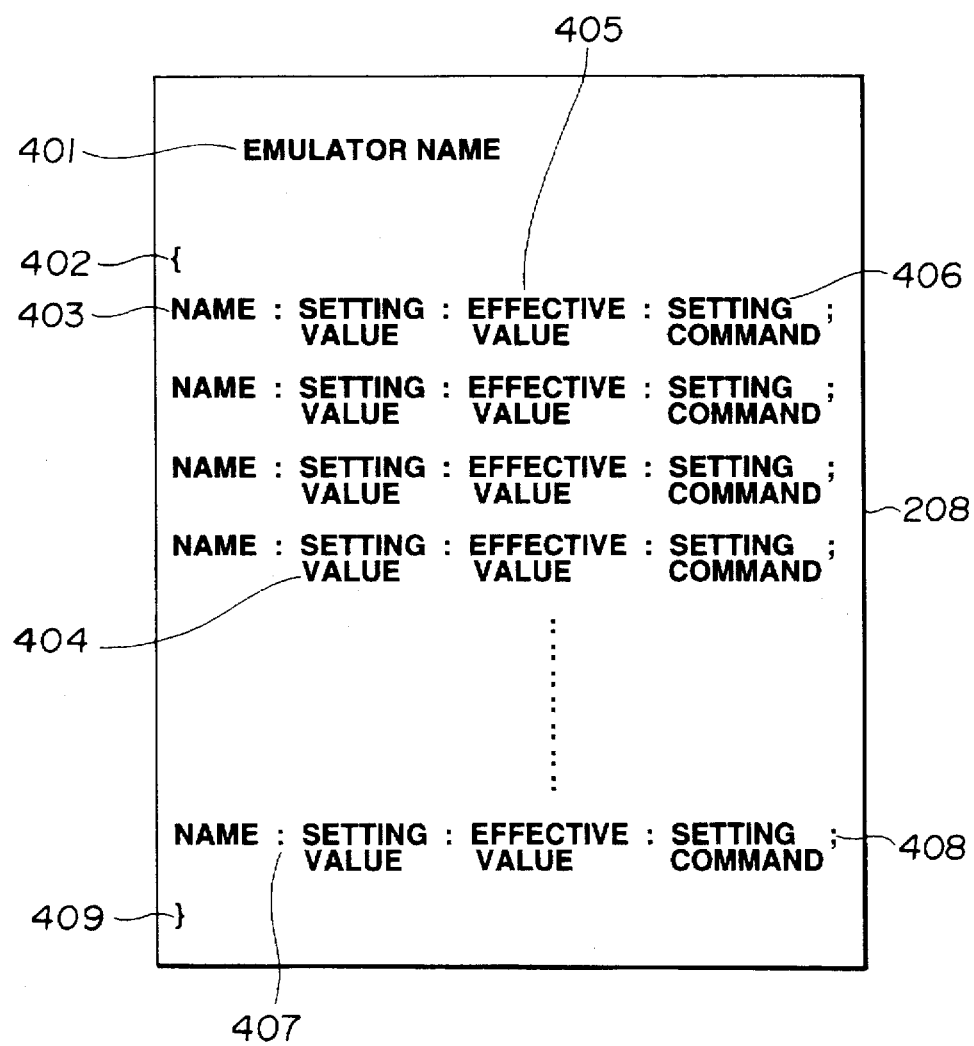
FIG. 3 is a diagram illustrating a data configuration of a setting-item file of the embodiment.

In step Si of FIG. 2, the user purchases or otherwise acquires emulator package (emulator C) 206 for printer 202. In step S2, it is determined whether emulator 207 of emulator package 206 is supplied in the form of a ROM or in the form of a program to be loaded in the RAM. If emulator 207 is supplied in the form of a program, the program is loaded in the RAM portion of RAM/ROM 204 of printer 202. If emulator 207 is supplied in the form of a ROM, the ROM is loaded to a ROM socket of RAM/ROM 204 of printer. The process then proceeds to step S5, where setting-item file 208 for printer 202 stored in a storage medium, such as a floppy disk or the like, is extracted from emulator package 206, and is set in host computer 201. Thus, the setting-item file 208 is installed in host computer 201. That is, the same file is installed in the printer and the host computer. FIG. 3 is a diagram illustrating a data configuration of setting-item file 208 set in printer 202.

In FIG. 3, reference numeral 401 represents the name of the target emulator (emulator C in the present embodiment). Reference numeral 402 represents a symbol indicating the start of setting-item file 208. Reference numeral 403 represents the name of each setting item for the printer peculiar to emulator 401. In each column of setting value 404, a default value for the corresponding setting item 403 for the printer is provided. When the user does not set a specific value, the default value is used. In each column of effective value 405, values which the corresponding setting item for the printer can have are provided. Printer setting program 205 displays these values on the picture surface or display of host computer 201. These effective values are also used by the user to determine if an input value is effective. Reference numeral 406 represents a setting command which is to be transmitted from host computer 201 to printer 202 so that the emulator identified by emulator name 401 can set the setting item identified by name 403. Delimiter 407 is used for delimiting the above-described name 403, setting value 404, effective value 405 and setting command 406. The above-described name 403, setting value 404, effective value 405 and setting command 406 constitute one setting item. Terminator 408 indicates delimitation of each setting item. Reference numeral 409 represents a symbol for indicating the end of setting-item file 208.

Figure 4:
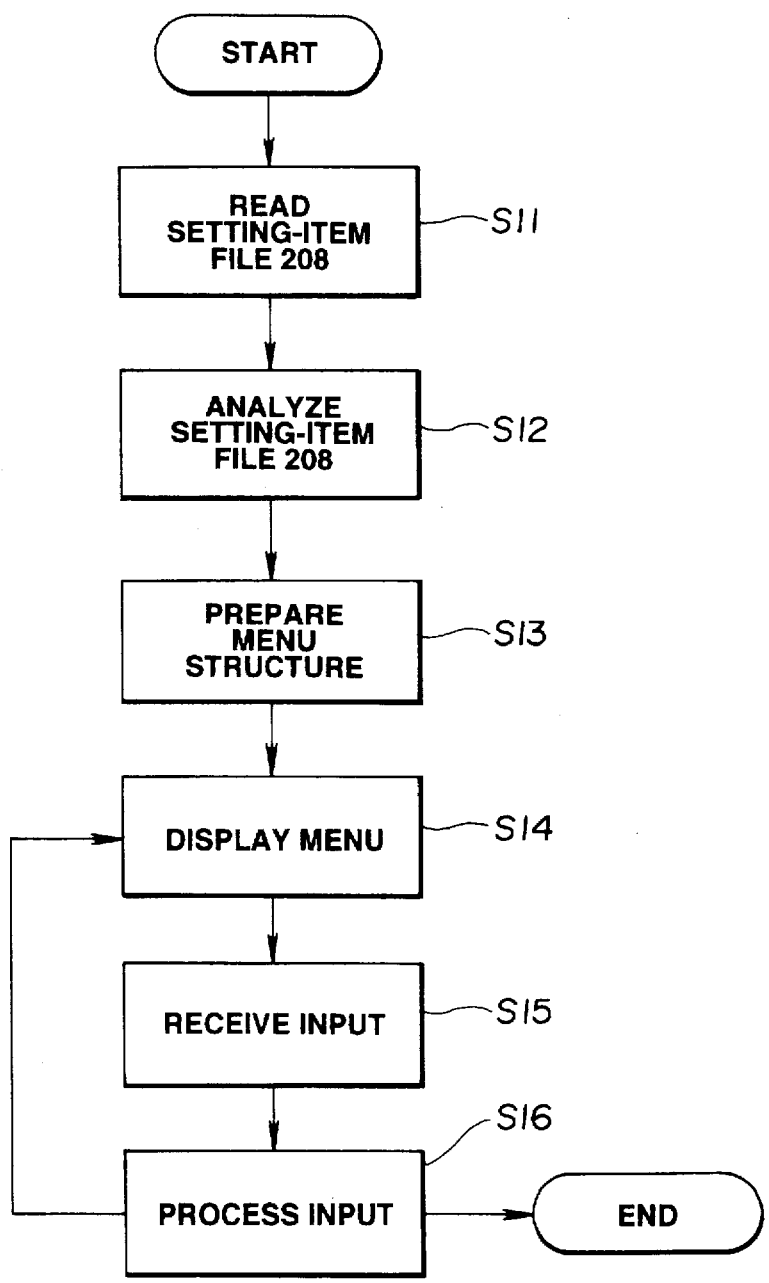
FIG. 4 is a flowchart illustrating the operation of a setting program of the embodiment.

Next, a description will be provided of the flow of the processing of various kinds of setting items for printer 202 executed by host computer 201 in the present embodiment with reference to the flowchart shown in FIG. 4.

Figure 5:
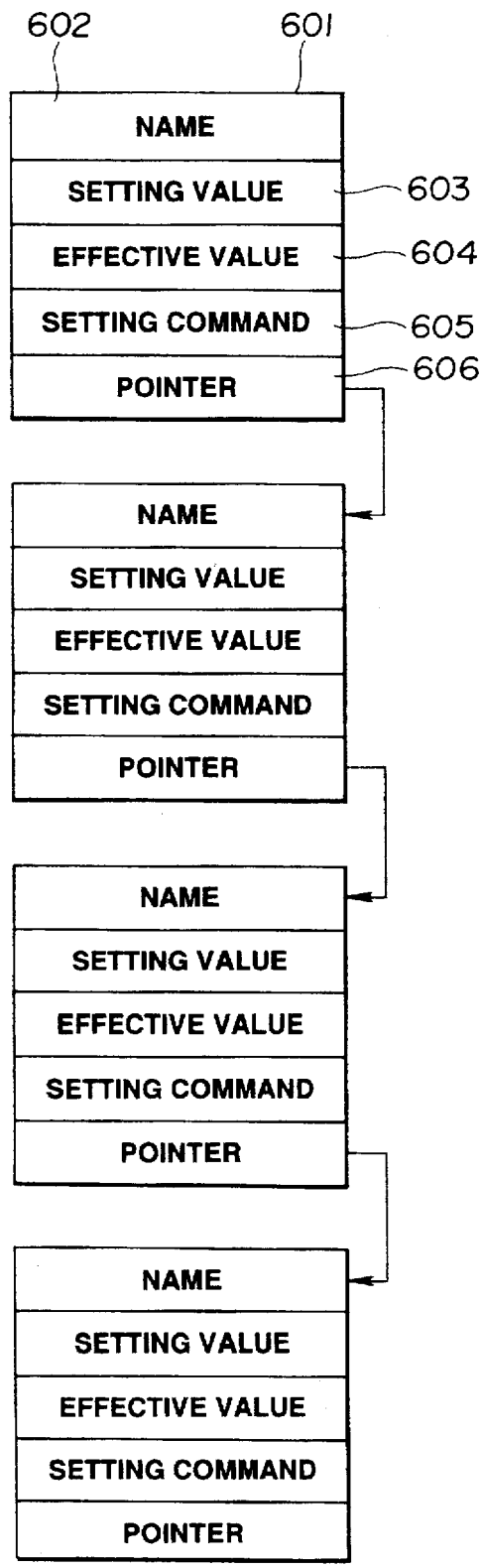
FIG. 5 is a diagram illustrating a data structure obtained by reading and analyzing the setting-item file of the setting program in the embodiment.

First, in step S11, host computer 201 reads setting-item file 208 installed in host computer 201. The process then proceeds to step S12, where the meaning of setting-item file 208 read in step S11 is analyzed. When setting-item file 208 is described based on the data configuration shown in FIG. 3, name 403, setting value 404, effective value 405 and setting command 406 for each setting item are extracted, and data structure 601 shown in FIG. 5 is formed. In step S13, a setting menu peculiar to emulator C is constructed in setting program 205 based on the result of the analysis performed in step S12. That is, when setting-item file 208 is described in the data structure shown in FIG. 3, adjacent data structures 601 shown in FIG. 5 are connected by pointer 606, to form data of the list structure shown in FIG. 5.

Name 602, setting value 603, effective value 604 and setting command 605 shown in FIG. 5 correspond to name 403, setting value 404, effective value 405 and setting command 406 shown in FIG. 3, respectively.

The process then proceeds to step S14, where the menu constructed in setting program 205 in step S13 is displayed on the picture surface of host computer 201. The process then proceeds to step S15, where a data input from the user in response to the menu displayed on the picture surface of host computer 201 is awaited. The process then proceeds to step S16, where the value of the corresponding setting item is changed in accordance with the value input in step S15. The result is displayed on the picture surface of host computer 201, and setting of various kinds of printing conditions and the like for printer 202 is performed. The processing of steps S14–S16 is repeatedly executed, and the processing is terminated when an end command has been input.

Various kinds of setting items thus set in host computer 201 are transmitted to printer 202 via cable 209, and are stored in emulator-C setting-item area 210 of nonvolatile RAM 203. When execution of a printing operation by printer 202 is performed based on emulator C, the above-described setting conditions stored in setting-item area 210 are read, and printing control is executed in accordance with the setting values.

Although in the above-described embodiment a simple data structure in which only various kinds of setting items for the printer are considered, it is also possible to construct a data structure having a hierarchical structure comprising groups, each of which includes some of these setting items.

It is also possible to indicate in setting program 205 for the printer items which are preferred to be set based on the currently set items, for example, by displaying the target items with black characters so as to notify the user that the indicated items can be set, and to indicate items which need not be set, for example, by displaying the target items with gray characters so as to notify the user that the indicated items cannot be set.

Figure 6:
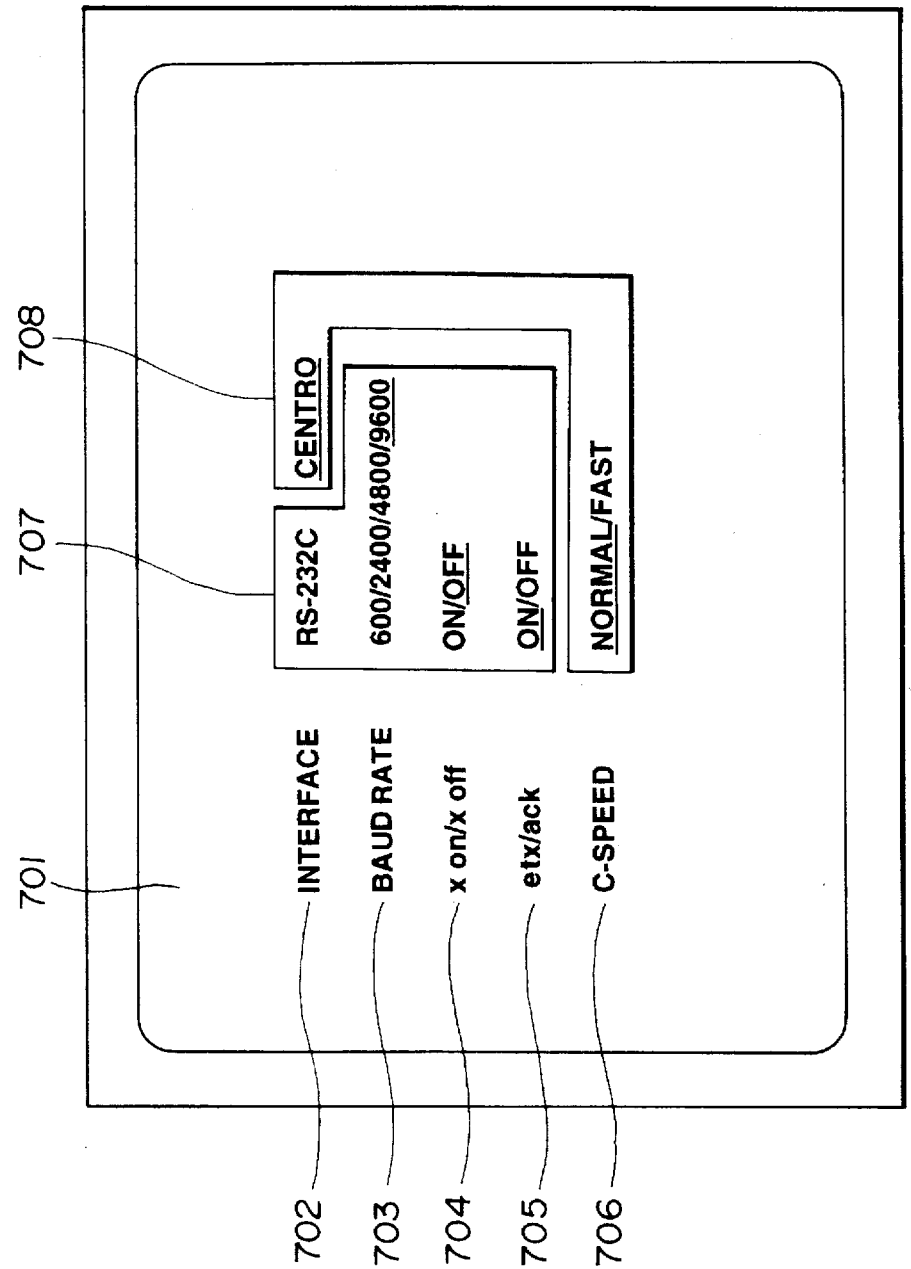
FIG. 6 is a diagram illustrating a display, in which items that can be set and items that cannot be set are clearly indicated, according to another embodiment of the present invention.
Figure 7:
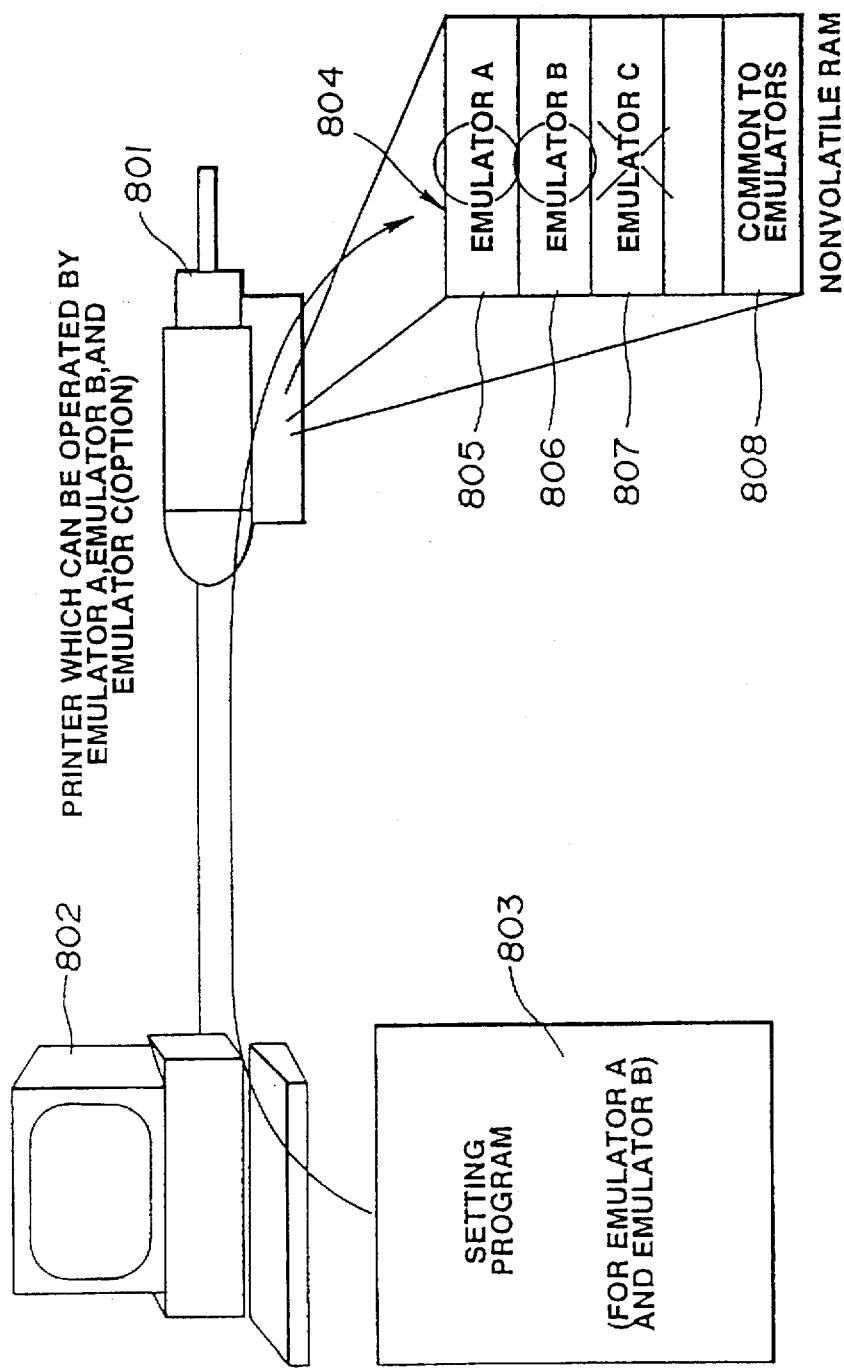
FIG. 7 is a diagram illustrating a problem in a conventional approach.

FIG. 6 is a diagram illustrating a menu display according to another embodiment of the present invention.

In FIG. 6, reference numeral 701 represents the display picture surface of host computer 201. Reference numeral 702 represents an item for setting interface conditions for connecting host computer 201 to printer 202. Two set values, i.e., RS-232C and CENTRO, are present for this item. Reference numeral 703 represents a setting item, which is effective only when the interface specification is set to RS-232C, for setting the transfer speed (baud rate) of RS232C. Reference numeral 704 represents a setting item, which is meaningful only when the interface specification is set to RS-232C, for setting whether x on/x off is to be used when performing communication based on RS-232C. Reference numeral 705 represents a setting item, which is meaningful only-when the interface specification is set to RS-232C, for setting whether ext/ack is to be used when performing communication based on RS-232C. As described above, the setting items 703–705 are effective only when the interface specification is set to RS-232C.

Reference numeral 706 represents a setting item, which is meaningful only when the interface specification is set to CENTRO, for setting the data transfer speed when performing communication between host computer 201 and printer 202 with the specification conforming to CENTRO.

As described above, when the interface specification is set to RS-232C and to CENTRO, setting items represented by reference numeral 707 and setting items represented by reference numeral 708 become effective, respectively.

By adding such a function to the above-described setting program 205, when interface specification 702 is set to RS-232C, setting item (C-speed) 706 is displayed with gray characters so as to notify the user that the item cannot be set, and the portion represented by reference numeral 707 is displayed with clear black characters so as to notify the user that the corresponding items can be set. On the other hand, when interface specification 702 is set to CENTRO, the setting items baud rate 703, x on/x off 704, and etx/ack 705 are displayed with gray characters to notify the user that these items cannot be set. To the contrary, the setting item C-speed 706 is displayed with black characters.

Figure 8:
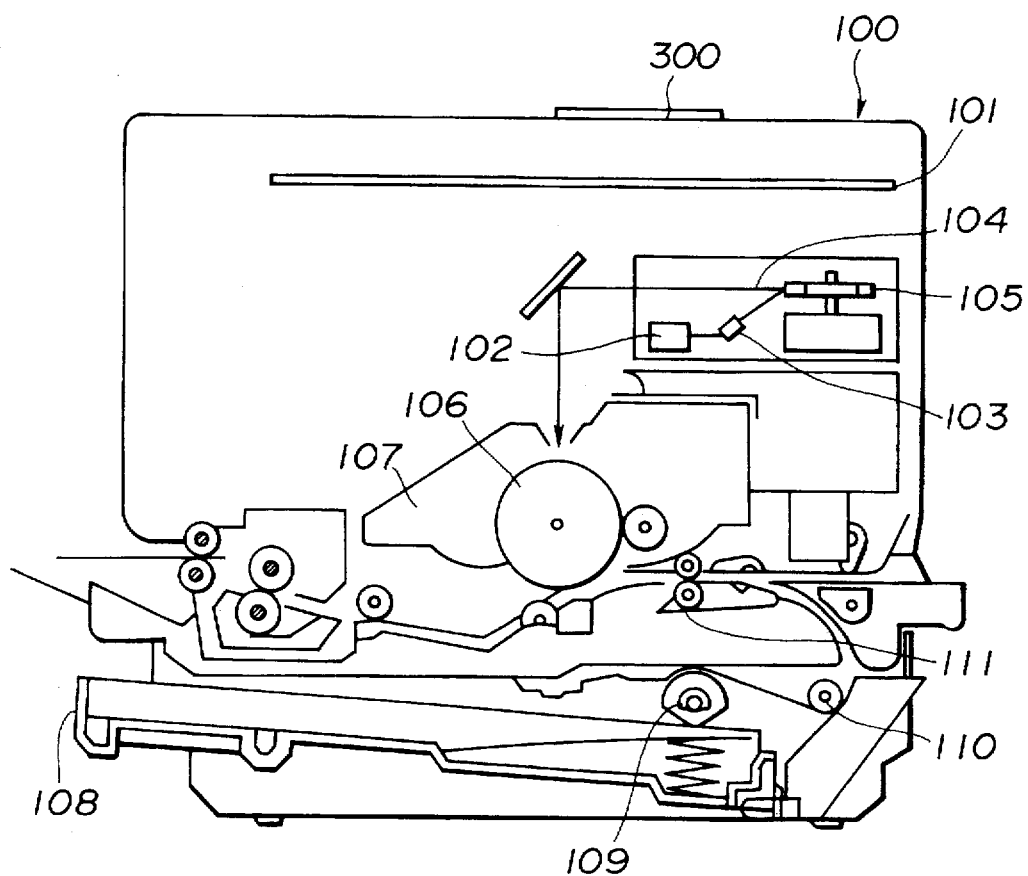
FIG. 8 is a cross-sectional view illustrating the internal structure of a laser-beam printer (LBP) to which the present invention can be applied.

FIG. 8 is a cross-sectional view illustrating the internal structure of a laser-beam printer (LBP) to which the present invention can be applied. The LBP is configured so that character patterns, form data and the like can be registered from a data source (a host computer or the like, not shown).

In FIG. 8, main body 100 of the LBP inputs and stores character information (character codes), form information, macro commands and the like supplied from the host computer or the like connected to the LBP, forms character patterns, form patterns and the like in accordance with the above-described information, and forms an image on recording paper, serving as a recording medium. Operation panel 300 includes various kinds of switches, an LED (light-emitting diode) display unit and the like for various kinds of operations. Printer control unit 101 controls the entire main body 100 of the LBP, and analyzes character information and the like supplied from the host computer. Printer control unit 101 mainly converts character information into a video signal representing the corresponding character patterns, and outputs the video signal to laser driver 102.

Laser driver 102 is a circuit for driving semiconductor laser 103, and switches on and off semiconductor laser 103 in accordance with the input video signal. Laser light 104 is deflected in a direction perpendicular to the plane of FIG. 8 by rotating polygonal mirror 105 to scan the surface of electrostatic drum 106. Thus, an electrostatic image of character patterns is formed on electrostatic drum 106. The latent image is developed by developing unit 107 provided around the circumference of electrostatic drum 106, and the developed image is transferred onto recording paper. The recording paper comprises cut sheets, which are accommodated in a sheet cassette mounted in main body 100 of the LBP. Each sheet of the recording paper is fed into the apparatus by sheet-feeding roller 109 and conveying rollers 110, 111, and is supplied to electrostatic drum 106.

Although a laser-beam printer has been illustrated as the image forming apparatus of the present embodiment, the apparatus is not limited to the laser-beam printer, but an ink-jet printer (to be described below) or the like may also be used.

Description of the outline of the main body of the apparatus

Figure 9:
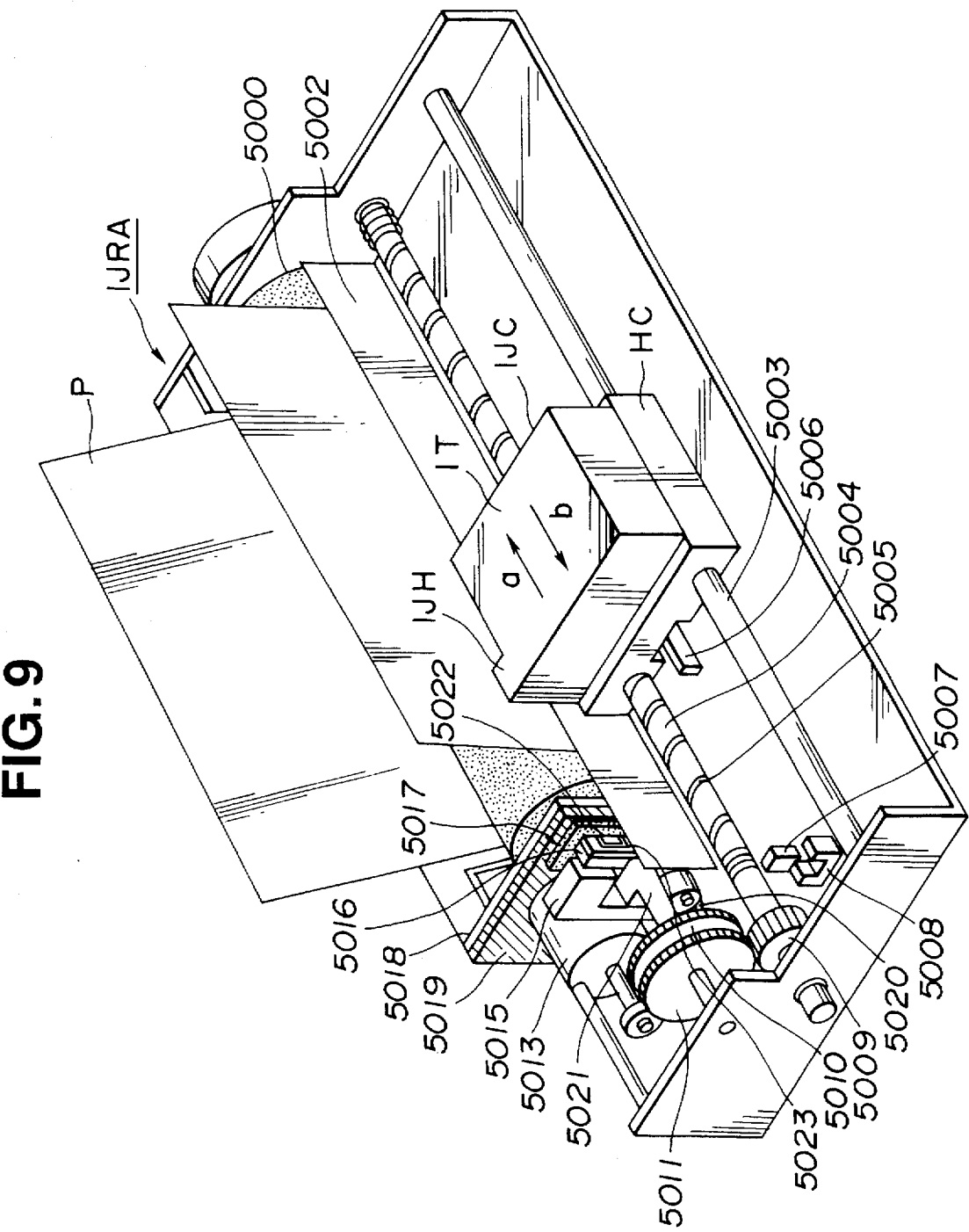
FIG. 9 is a schematic diagram illustrating an ink-jet recording apparatus (IJRA) to which the present invention can be applied.

FIG. 9 is a schematic diagram illustrating an ink-jet recording apparatus (IJRA) to which the present invention can be applied. In FIG. 9, carriage HC, which engages helical groove 5004 of lead screw 5005 rotating via driving-force transmission gears 5011 and 5009 in accordance with the forward or reverse rotation of driving motor 5013, includes a pin (not shown), and is reciprocated in the directions of arrows a and b. Ink-jet cartridge IJC is mounted on carriage HC. Sheet-pressing plate 5002 presses the sheet of recording paper against platen 5000 along the moving direction of carriage HC. Photocoupler components 5007 and 5008 serve as home-position detection means for confirming the presence of lever 5006 of carriage HC in the region of these components, and performing, for example, switching of the direction of rotation of motor 5013. Member 5016 supports cap member 5022 which caps the front surface of the recording head. Reference numeral 5015 represents suction means for sucking the inside of the cap, which performs a suction recovery operation of the recording head via opening 5023 of the cap. Reference numeral 5017 represents a cleaning blade. Reference numeral 5019 represents a member for making cleaning blade 5017 movable back and forth, which is supported by supporting plate 5018 of the main body of the apparatus. The shape of cleaning blade 5017 is not limited to the illustrated shape, but any well-known cleaning blade may, of course, be used. Reference numeral 5021 represents a lever for starting suction for a suction recovery operation, which moves in accordance with the movement of cam 5020, which engages carriage HC. The driving force of driving motor 5013 is transmitted by known transmission means, such as a clutch or the like, to move lever 5021.

The apparatus is configured so that each of the above-described capping, cleaning and suction recovery operations is performed at the corresponding position by the function of lead screw 5005 when carriage HC reaches the region of the home-position side. These operations can be performed provided that a desired operation is performed with an appropriate timing.

Description of the configuration of control

Figure 10:
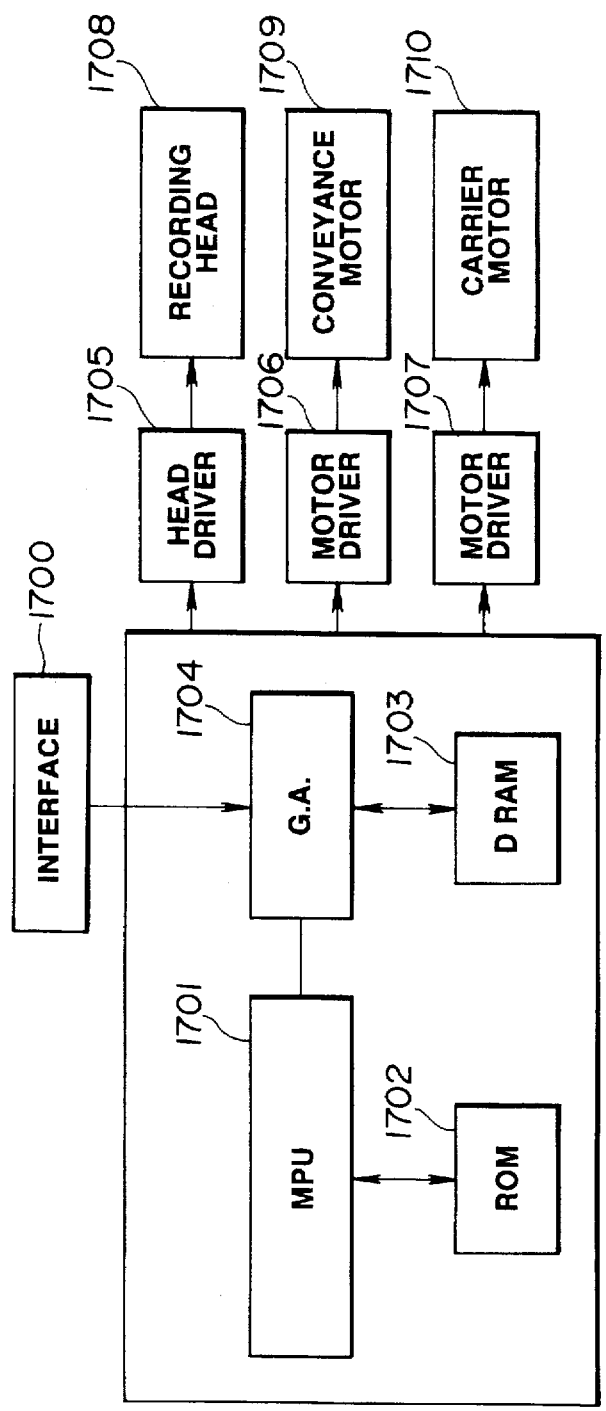
FIG. 10 is a block diagram illustrating the configuration of the ink-jet recording apparatus shown in FIG. 9.

Next, a description will be provided of the configuration of recording control for the above-described apparatus with reference to the block diagram shown in FIG. 10. In FIG. 10 illustrating a control circuit, there are shown interface 1700 for inputting recording signals, MPU (microprocessing unit) 1701, program ROM 1702 for storing control programs executed by MPU 1701, and dynamic RAM 1703 for storing various kinds of data (the above-described recording signals, recording data to be supplied to the head, and the like). Gate array 1704 controls the supply of recording data to recording head 1708, and also controls data transfer between interface 1700, MPU 1701 and RAM 1703. Carrier motor 1710 carries recording head 1708, and conveyance motor 1709 conveys recording paper. Head driver 1705 drives the head. Motor drivers 1706 and 1707 drive conveyance motor 1709 and carrier motor 1710, respectively.

In the above-described configuration, when a recording signal has entered interface 1700, the recording signal is converted into recording data for printing by gate array 1704 and MPU 1701. While motor drivers 1706 and 1707 drive the corresponding motors, recording head 1708 is driven in accordance with the recording data transmitted to head driver 1705, whereby printing is performed.

The components of the present invention can be incorporated in the above-described configuration of control of the ink-jet printer. Accordingly, it is apparent that the present invention can be applied not only to the laser-beam printer, but also to the above-described ink-jet printer or the like.

The present invention may be applied to a system comprising a plurality of apparatuses, or to an apparatus comprising a single unit. In addition, the present invention may, of course, be applied to a case in which the invention is achieved by supplying a system or an apparatus with programs for executing the invention.

As described above, according to the above-described embodiments, by providing the function of adding a setting item to a setting program for setting various kinds of conditions for a printer by reading a setting-item file, a single setting program can deal with the addition of setting items peculiar to a newly purchased emulator or the like.

As described above, according to the present invention, various kinds of setting items can be set or changed in accordance with a function which has been newly added at the side of a printer.

The individual components shown in outline or designated by blocks in the drawings are all well-known in the output control method and apparatus arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A host computer connected to an output apparatus through an interface, said computer comprising:

file reading means for reading a new setting-item file peculiar to a newly added operation program of the output apparatus menu construction means for constructing a new setting menu of the setting-item file based on the new setting item file read by said file reading means;

setting means for setting a new setting item of the setting-item file based on information input in response to displaying of the new setting menu constructed by said menu construction means; and transmitting means for transmitting the set new setting item to the output apparatus for setting up the set new setting item on the output apparatus.

2. A computer according to claim 1, wherein an operator inputs the information in response to displaying of the new setting menu.

3. A computer according to claim 1, wherein the new setting item includes interface conditions.

4. A computer according to claim 1, wherein the new setting item includes a data transfer speed.

5. A computer according to claim 1, wherein the output apparatus comprises a printer.

6. A computer according to claim 5, wherein the printer comprises a laser-beam printer.

7. A computer according to claim 5, wherein the printer comprises an ink jet printer.

8. A setting-up method for a setting item executed by a host computer connected to an output apparatus through an interface, said method comprising the steps of:

reading a new setting-item file peculiar to a newly added operation program of the output apparatus ;

constructing a new setting menu of the setting-item file based on the new setting item vile read in said reading-step;

setting a new setting item of the setting-item file based on information input in response to displaying of the new setting menu constructed in said constructing step; and transmitting the set new setting item to the output apparatus for setting up the set new setting item on the output apparatus.

9. A method according to claim 8, wherein an operator inputs the information in response to displaying of the new setting menu.

10. A method according to claim 8, wherein the new setting item includes interface conditions.

11. A method according to claim 8, wherein the new setting item includes a data transfer speed.

12. A method according to claim 2, wherein the output apparatus comprises a printer.

13. A method according to claim 12, wherein the printer comprises a laser-beam printer.

14. A method according to claim 12, wherein the printer comprises an ink jet printer.

15. A computer-readable memory for storing a program executed by a host computer connected to an output apparatus through an interface, the program comprising the steps of:

constructing a new setting menu of a setting-item file peculiar to a newly added program of the output apparatus; and setting a new setting item of the setting-item file based on information input in response to displaying of the new setting menu constructed in said constructing step.

16. A computer-readable memory according to claim 15, wherein an operator inputs the information in response to displaying of the new setting menu.

17. A computer-readable memory according to claim 15, wherein the new-setting item comprises interface conditions peculiar to the newly added program.

18. A computer-readable memory according to claim 15, wherein the new setting item comprises a data transfer speed peculiar to the newly added program.

19. A computer-readable memory according to claim 15, wherein the output apparatus comprises a printer.

20. A computer-readable memory according to claim 19, wherein the printer comprises a laser-beam printer.

21. A computer-readable memory according to claim 19, wherein the printer comprises an ink jet printer.

* * * * *

UNITED STATES PATENT AND TRADEMARK OFFICE
CERTIFICATE OF CORRECTION

PATENT NO.   : 5,751,922
DATED        : May 12, 1998
INVENTOR(S)  : Harada

It is certified that error appears in the above-indentified patent and that said Letters Patent is hereby corrected as shown below:

COLUMN 2:

Line 1, "-is" should read --is--; and
    Line 10, "conduction" should read --conjunction--.

COLUMN 3:

Line 4, "step Si" should read --step S1--.

COLUMN 4:

Line 51, "only-when" should read --only when--.

COLUMN 5:

Line 60, "5013" should read --5013,--.

COLUMN 7:

Line 28, "apparatus" should read --apparatus;--.

UNITED STATES PATENT AND TRADEMARK OFFICE
CERTIFICATE OF CORRECTION

PATENT NO. : 5,751,922
DATED : May 12, 1998
INVENTOR(S) : Harada

It is certified that error appears in the above-indentified patent and that said Letters Patent is hereby corrected as shown below:

<u>COLUMN 8</u>:

Line 2, "apparatus ;" should read --apparatus;--;
    Line 4, "vile" should read --file--, and "reading-"
      should read --reading--; and
    Line 20, "claim 2," should read --claim 8,--.

Signed and Sealed this

Twenty-fourth Day of November, 1998

*Attest:*

BRUCE LEHMAN

*Attesting Officer*     *Commissioner of Patents and Trademarks*